Figure 1:
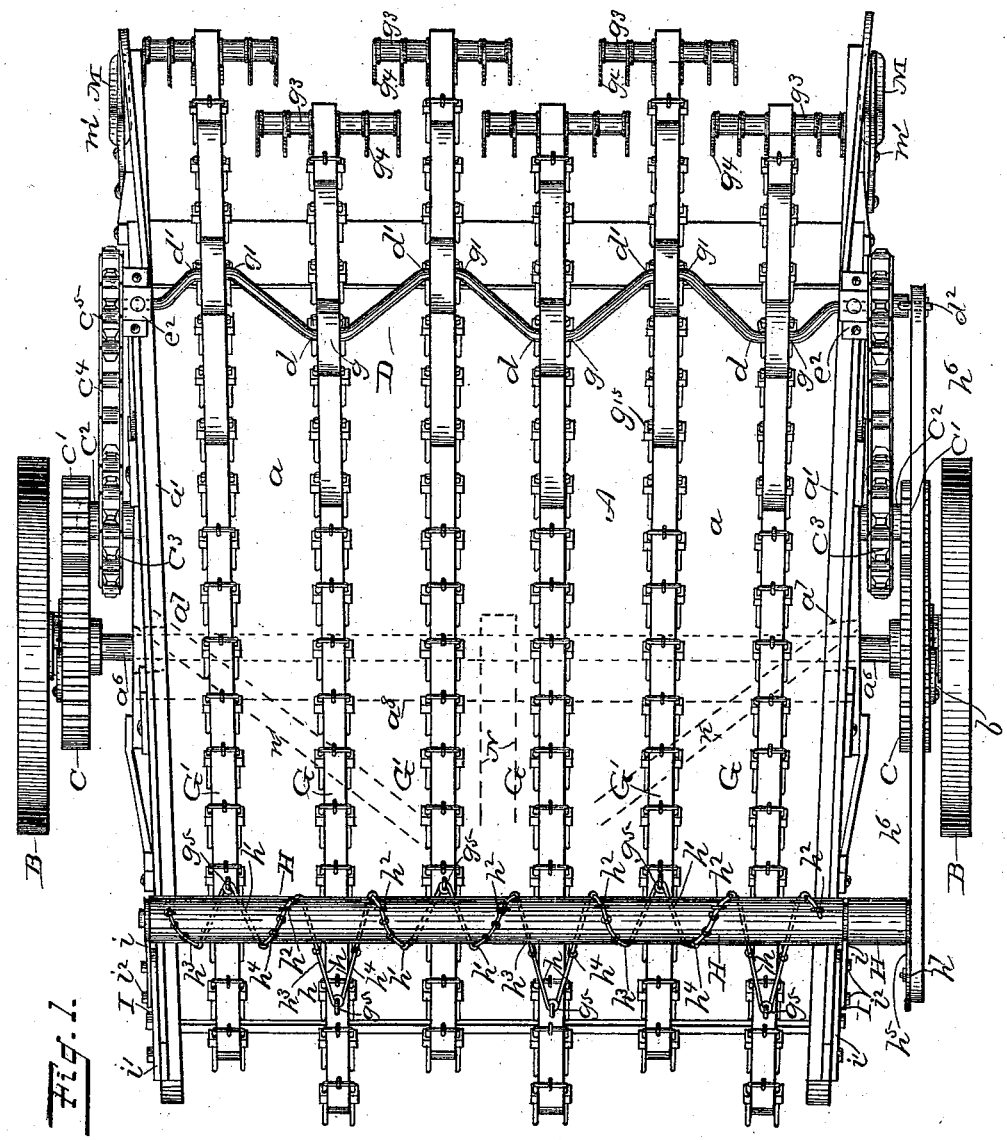

(No Model.)  
4 Sheets—Sheet 1.

C. E. WHITE.
HAY RAKE AND LOADER.

No. 518,085.  
Patented Apr. 10, 1894.

Witnesses:  
S. R. Richards.  
Chas Hultgren

Inventor:  
Charles E. White,  
By W. B. Richards,  
Atty.

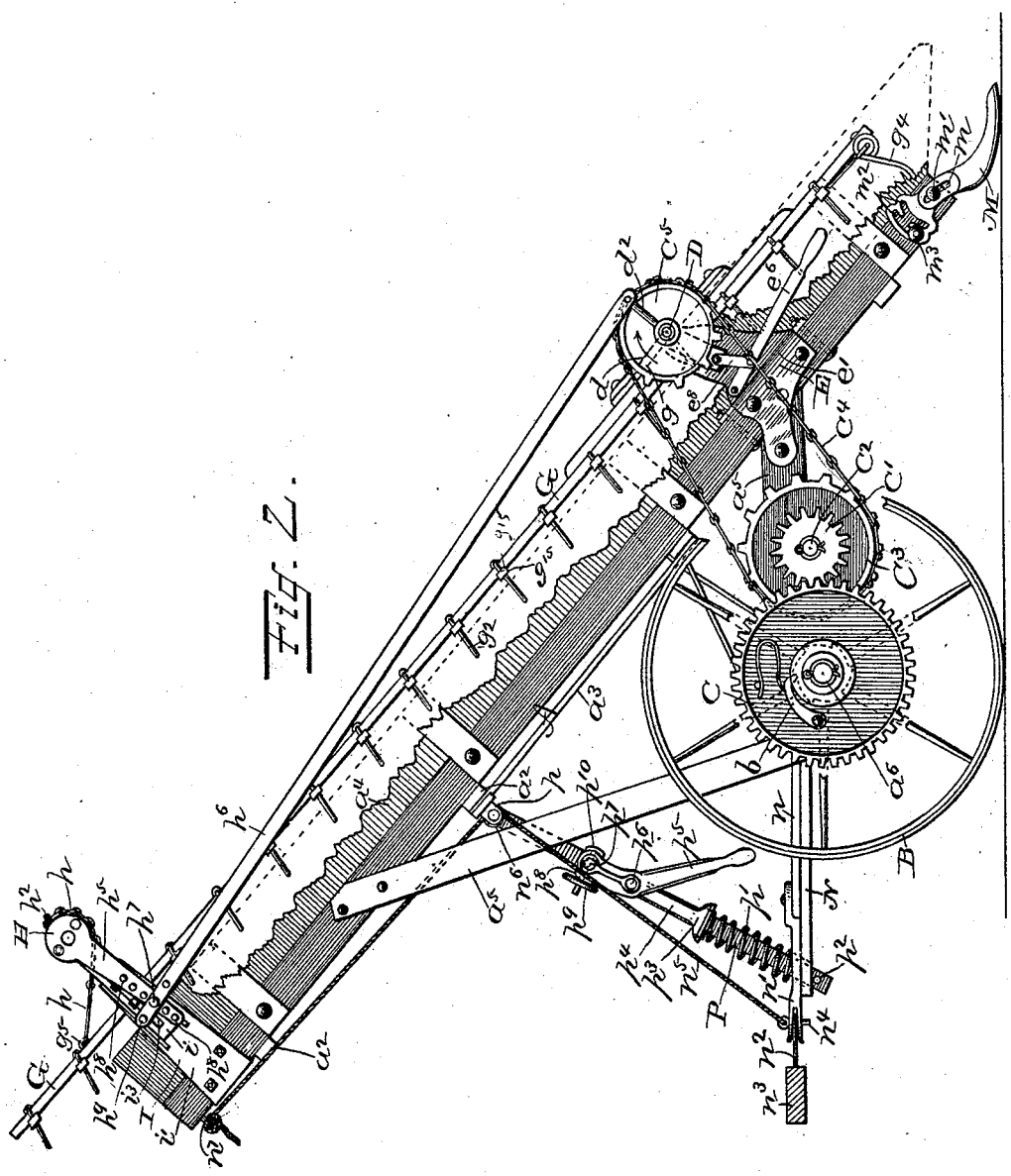

(No Model.) 4 Sheets—Sheet 3.
C. E. WHITE.
HAY RAKE AND LOADER.
No. 518,085. Patented Apr. 10, 1894.
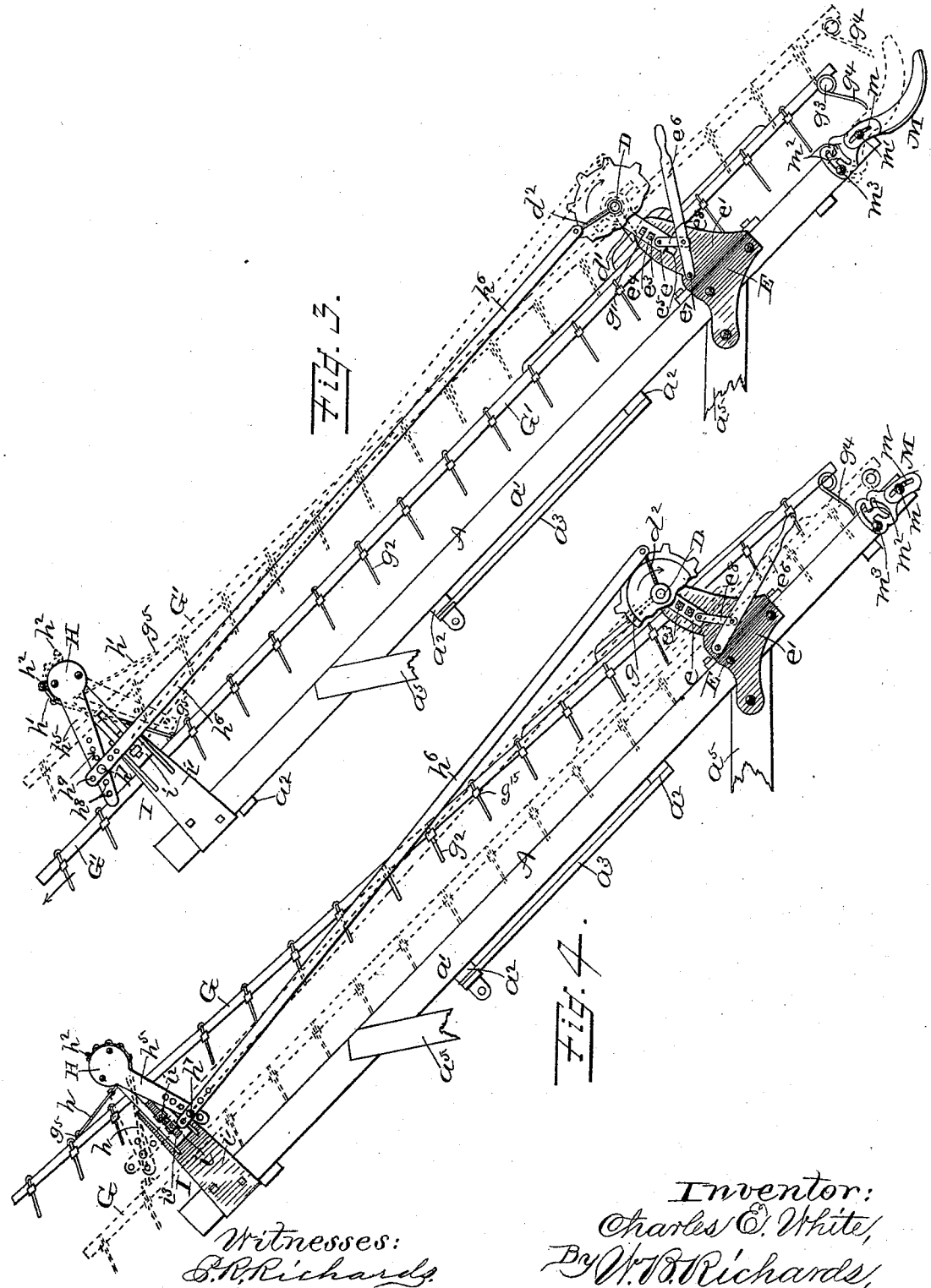
Witnesses:
E. R. Richards
Wm DuVall Brown
Inventor:
Charles E. White,
By W. B. Richards,
Atty.

(No Model.) 4 Sheets—Sheet 4.
C. E. WHITE.
HAY RAKE AND LOADER.
No. 518,085. Patented Apr. 10, 1894.
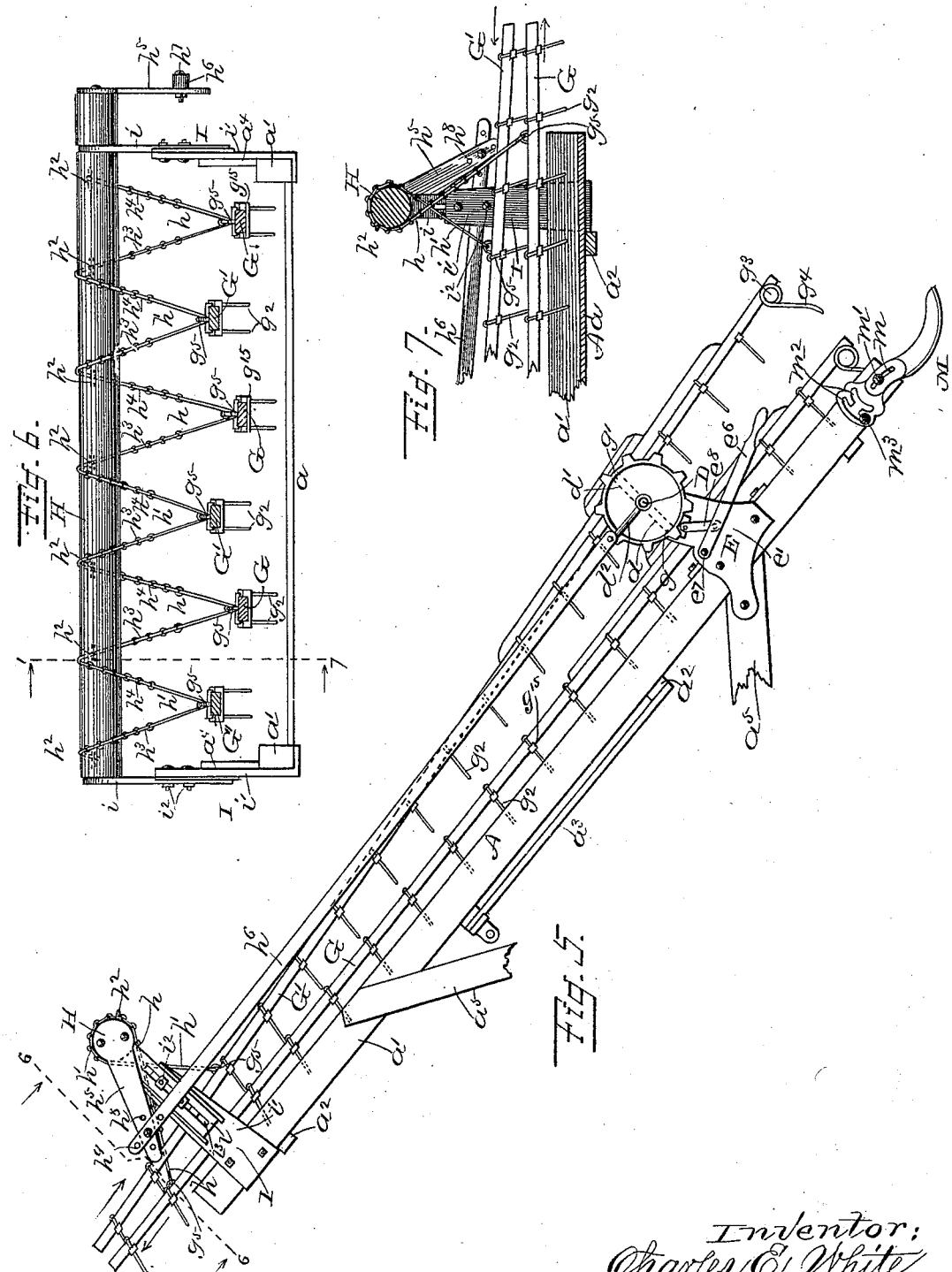

UNITED STATES PATENT OFFICE.

CHARLES E. WHITE, OF MOLINE, ILLINOIS, ASSIGNOR TO THE DEERE & MANSUR COMPANY, OF SAME PLACE.

HAY RAKE AND LOADER.

SPECIFICATION forming part of Letters Patent No. 518,085, dated April 10, 1894.

Application filed January 9, 1893. Serial No. 457,834. (No model.)

*To all whom it may concern:*

Be it known that I, CHARLES E. WHITE, a citizen of the United States, residing at Moline, in the county of Rock Island and State of Illinois, have invented certain new and useful Improvements in Hay Rakes and Loaders, of which the following is a specification.

The hay rake and loader to which the invention pertains that is herein described is of that class in which the hay is impelled upwardly over an inclined platform by alternately reciprocating gangs of rake bars which are provided with teeth for that purpose, and also with teeth for raking and collecting hay and drawing or delivering it onto the lower end of the inclined platform, and which rake bars are operated by a multicrank shaft with its cranks so disposed as to give simultaneous endlong movement to all of the rake bars of each gang of such rake bars alternately with reference to the simultaneous endlong movements of the rake bars of its fellow gang.

A leading object of my present invention is to lift the rake bars with a positive movement out of the hay at their upper ends, while they are being drawn rearwardly by the multicrank shaft, by means which while lifting them, will not interfere with their ordinary rising and falling movements to some extent independently thereof, and which can be used to lift the rake bars at their upper ends with a positive movement when said ends are free to rise and fall independently of each other, or when the rake bars of each gang are connected so as to rise and fall simultaneously; and to this main end and object my invention consists in structural peculiarities, and combinations of parts described, and pointed out in the claims forming part of this specification. In carrying out this leading object of my invention other subsidiary improvements are involved, which consist in novel structural features, and in combinations of parts, which structural peculiarities, and which parts separately and in combination will be found hereinafter described, and expressed in the claims of this specification.

The preferred construction of parts and arrangement thereof are illustrated in the accompanying drawings, in which—

Figure 1 is a top plan of a hay rake and loader embodying my invention; Fig. 2, a side elevation, the near drive wheel, and the side board of the inclined platform, shown as broken away, to show other parts. Only one rake bar is shown in this figure; Fig. 3, a side elevation of the inclined platform without its sideboards, and of a rake bar of the gang thereof which is not shown at Fig. 2, the mechanism for lifting said gang of rake bars at their upper ends, part of the driving mechanism and other adjacent parts; Fig. 4, a side elevation of the inclined platform without its side boards, the rake bar shown at Fig. 2 and lifting mechanism, but in different relative positions to that shown at Fig. 2. Other adjacent parts are shown in this figure. Fig. 5, a side elevation of the inclined platform without its side boards, of a rake bar of both gangs of rakes, of the rake bar lifting mechanism, and other adjacent parts; Fig. 6, an end elevation of the inclined platform, sectional elevation of both gangs of rake bars in the line 6, 6, in Fig. 5, and elevation of the rake bar lifting mechanism, viewed at right angles to said line 6, 6; Fig. 7, a sectional elevation in the line 7, 7, in Fig. 6, showing only parts contiguous to the upper end of the inclined platform, and in same relative positions as shown at Fig. 5.

In the different figures of the drawings the same letter indicates the same part, whether the part be in full lines or in intermittent lines.

In order to describe and explain clearly the nature and operation of my improvements, I have hereinafter described an ordinary construction of hay rake and loader embodying as a part thereof certain novel features and also embodying my improvements herein described and claimed, and in such descriptions have pointed out in what features my improvements herein claimed consist, and also pointed out the other novel features referred to, and which do not constitute the subject matter of my invention herein claimed.

The inclined platform A is of an ordinary construction, having a bed or bottom part $a$, sides $a'$, transverse frame bars $a^2$, braces $a^3$, and side boards $a^4$, supported by side frame bars $a^5$, which are journaled or fulcrumed on the axle $a^6$, near the ends thereof by bearings $a^7$, to permit of the axle rotating therein and of swinging or tilting the inclined platform thereon, to raise or lower its rear or lower end, and to permit of it so tilting or swinging while in use. The axle $a^6$, is supported by wheels B on its outer ends, which are loosely mounted thereon. Each wheel B is adapted in an ordinary manner to rotate the axle when the machine is drawn forwardly, by means of a click and pawl mechanism $b$, which engages the wheel B with a pinion C, one of which pinions is fixed to the axle adjacent to each wheel B, and to not rotate the axle when either wheel is rotated backwardly. The pinions C each engage with an adjacent pinion C' fixed to a shaft $c^2$, to which shaft is also fixed a sprocket wheel $c^3$, which is geared by a sprocket chain $c^4$ with a sprocket wheel $c^5$. One of the sprocket wheels $c^5$ is fixed to each end of the multicrank shaft D which has two sets of cranks $d$, and $d'$, so disposed that the cranks $d$ all project in the same radial plane from the axial line of the multicrank shaft and all of the cranks $d'$ project in the same plane but in diametrically opposite directions to the cranks $d$ from the axial line of the multicrank shaft. The crank shaft D is journaled in standards E which are fixed, or preferably adjustably fixed, to the inclined platform A.

The standards E are adjustable in length or height as follows: Each standard consists of two parts, an upper part $e$ and a lower part $e'$. The upper part $e$ carries the bearing boxes $e^2$ (see Fig. 1), for the multiple crank shaft, and is adjustable on the lower part $e'$, which part $e'$ is fixed to the side of the platform A. The part $e$ can be fixed in position after such adjustments by means of nutted bolts $e^3$ which pass through holes $e^4$ in the part $e$ and through a slot $e^5$ in the part $e'$. To aid in easily making these adjustments a hand lever $e^6$ is used, which is fulcrumed at $e^7$ on the fixed part $e'$, of the standard, and is pivotally connected by a link rod $e^8$ with the sliding part $e$. By first loosening the nuts on the bolts $e^3$, the upper part $e$ of each standard can be raised or lowered by the hand lever $e^6$, as may be desired, to adjust the crank shaft D in higher or lower positions with reference to the platform bed.

The adjustable standards E are not claimed herein, as they are in combination with other adjustments, shown, described and claimed in an application for patent for hay rakes and loaders made by Charles E. White and Charles P. A. Friberg, Serial No. 457,457, filed January 6, 1893.

The rake bars G of one gang thereof are hinged at $g$ to the cranks $d$, and the rake bars G' of the other gang are hinged at $g'$ to the cranks $d'$. All of the rake bars are provided with teeth $g^2$ for impelling the hay upwardly of the platform bed, and the rake heads $g^3$ are provided with teeth $g^4$ for collecting the hay and drawing or delivering it onto the lower end of the platform bed. The multicrank shaft D revolved in the direction indicated by the arrow on the sprocket wheel $c^5$, and revolved by the wheels B, by means of the intermediary mechanism which gears it therewith, as shown, and described, will impart to each rake bar where it is hinged to its respective crank, an orbital movement in a circle, or with respect to the inclined platform a backward and forward, and approaching and receding, or rising and falling movement, and will impart to the upper ends of the rake bars, a forward and backward movement, in an ordinary manner, the gangs of rake bars moving upwardly of the inclined platform alternately, the teeth of the rake bars of one gang or of the other gang will be continuously acting to impel or force hay upwardly of the platform. In an ordinary type of this class of hay rakes and loaders, the rising movements at the upper ends of the rake bars are given them by the withdrawal of the inclined teeth from the hay as the rake bars are drawn backwardly, and as the rake bars are moved forwardly the rising movement is given them by temporary increases of the quantity of hay passing upwardly beneath them, whether the series of rake bars of each gang thereof are connected together to rise and fall simultaneously, or are not connected together, so that they may rise and fall independently of each other and in both of these cases the falling movement of the rake bars at their upper ends, occurs with any decrease in the quantity of hay passing upward beneath them, or an entire cessation thereof at intervals; and in another class thereof, as shown by certain United States patents, positive rising and falling movements of the upper ends of the rake bars are given them entirely by a multicrank shaft similar to the crank shaft which drives them and which is geared to revolve simultaneously and coincidently with the driving crank shaft.

In my improved rake bar supporter and lifter, a rock-shaft, or winding drum H extends transversely across the upper end portion of the inclined platform, and is there supported a short distance above the rake bars by standards I, one at each side of the platform. The rock-shaft H is journaled at its ends to the upper parts $i$ of the standards I, and the parts $i$ of the standards are adjustable on their lower parts $i'$, and are held in position after such adjustments by nutted bolts $i^2$ which pass through slots $i^3$ in the parts $i$, and through holes in the parts $i'$, for the purpose of adjusting and fixing the rock-shaft H at different distances from the upper end part of the inclined platform.

Two sets of lifting chains or cords $h$, $h'$, are fixed to the rocking shaft or drum H. The chains $h$ of one set thereof are wound or wrapped in one direction upon the rock shaft H, and the chains $h'$ of the other set are wound or wrapped in an opposite direction thereon. The upper ends of each chain, $h$, $h'$, are fixed at $h^2$ to the rock shaft, or at any other suitable point thereon, and their lower mid-length parts are fixed, to the upper ends of the rake bars at $g^5$, one of the chains $h$ to each rake bar G, and one of the chains $h'$ to each rake bar G'. For the purpose only of lifting the rake bars, by means hereinafter described, a single chain extending to each rake bar would be sufficient, but as shown best at Figs. 1 and 6, and as preferred, each lifting chain is in two parts, $h^3$, $h^4$, each part extending upwardly from the rake bar to which it is fixed to the rock shaft, and each part extending outwardly from the rake bar in an opposite direction from its fellow part, in such manner that the chain when wound or wrapped on the rock shaft H by a partial rotation thereof will not only raise or lift the end of the rake bar to which it is fixed, but the parts $h^3$, $h^4$, extending laterally from the rake bar, as shown and described, will also tend to hold the rake bars at their upper ends in their proper positions laterally, as they are moved back and forth endwise by the multicrank shaft.

One end of the rock shaft H is extended and has fixed thereto a crank arm $h^5$ which is pivotally connected by a connecting rod $h^6$ with a crank arm $d^2$ fixed to the outer end of the multicrank shaft D, in a radial plane at a right angle or approximately so to the plane of the cranks $d$, $d'$, so that each revolution of the multicrank shaft D will rock or oscillate the rock shaft H forward and backward on its axis thereby rocking or swinging the crank arm $h^5$ and the rock shaft H in one direction coincidently with the backward endlong movements of one gang of rake bars and in an opposite direction coincidently with the backward movements of the other gang of rake bars. The chains $h$ and $h'$ are wound or wrapped respectively on the shaft H in such directions that as the crank arm $h^5$ is swung into the position shown at Fig. 5 it will wind the chains $h'$ upon the shaft H so as to raise or lift the upper ends of the rake bars G', and at the same time will unwind the chains $h$ to lower the upper ends of the rake bars G, as shown at same figure, at Fig. 6, and also at other figures; thus lowering the rake bars G at their upper ends as they are advanced or moved upwardly of the inclined platform to elevate the hay thereover, and lifting the upper ends of the rake bars G' with a positive movement as they are drawn backwardly, whereby their rake teeth $g^2$ are quickly and with positiveness withdrawn from the hay, so as to reduce to a minimum any interference thereof with the advance of the hay by the rake teeth $g^2$ of the now forwardly moving rake bars G. When the rake bars G are being drawn backwardly by the multicrank shaft the crank arm $h^5$ will be swung to and past the positions shown respectively at Figs. 2 and 4, and in so swinging will carry the shaft or drum H therewith and wind the chains $h$ on said shaft, and thereby lift the rake bars G with a positive movement as said rake bars are drawn backwardly, and thus withdraw their rake teeth $g^2$ quickly and with positiveness from the hay, so as to reduce to a minimum any interference thereof with the advance of the hay by the teeth $g^2$ of the now forwardly moving rake bars G', which are lowered to act on the hay by the last described swing of the crank arm $h^5$ and oscillatory movement of the rock shaft H. The rake bars are not lifted at their upper ends in a line at right angles to the inclined platform, but in a direction the resultant of their ordinary raising movement given them by the inclined teeth as the rake bars are drawn rearwardly by the multicrank shaft, and the movement given them by the oscillating rock shaft or drum H. The duration of the oscillatory movements of the rock shaft H in respect to the duration of the forward and backward movements of the rake bars, and the extent of the oscillatory movements of the rock shaft H in both directions may be adjusted by insertion of the bolt $h^7$ which pivots the connecting rod $h^6$ to the crank arm $h^5$, in different holes $h^8$ of the series shown in said crank arm; and the oscillating movement of said shaft may be increased in either direction in reference to its movement in an opposite direction, by insertion of the pivot bolt $h^7$ in the different holes $h^9$ in the rod $h^6$ in an evident manner. The chains $h$, $h'$, gage the nearness with which the teeth $g^2$ at the upper ends of the rake bars can approach the bed of the inclined platform, when in their lowest positions and at the same time being flexible will permit of either rake bar, or any number thereof rising independently at the upper end or ends thereof at any time when an increased quantity or thickness of hay is passing thereunder. The chains $h$, $h'$, can be adjusted in length, for the purpose of causing the rake teeth $g^2$ at the upper ends of the rake bars to operate closer to or farther from the bed of the platform, as may be desired in different kinds of hay, and by adjusting the parts $i$ of the standards I in higher and lower positions the same results can be accomplished.

At Fig. 3 the upper part $i$ of the standard I is shown as adjusted and fixed in its highest position to cause the rake teeth $g^2$ at the upper ends of the rake bars, and when in their lowest positions, to operate at some distance from the platform, while in the other figures the part $i$ is adjusted in lower positions to cause the rake teeth to operate nearer the bed of the platform, at their same ends. At same figure (3), the upper part $e$ of the standard E is also shown as adjusted and fixed in its higher position, so that the rake bars are made by such adjustments to operate at both of their ends farther from the bed of the platform. A shoe M at each side and lower end of the platform, has a slot $m$ for its pivotal bolt $m'$, and slots $m^2$ for a bolt $m^3$ by which the shoe can be fixed after adjusting it in an evident manner to hold the lower end of the platform and thereby the rakes $g^4$ to operate at different distances from the surface of the ground. This adjustment of the shoe M can be utilized in various evident ways with the adjustments hereinafter described of the standards E and I, and especially for lowering the lower end of the platform and the rake teeth $g^4$ toward the surface of the ground by raising the shoe M as shown at Fig. 3 by dot lines, when the rake bars are held in their higher positions by the standards E and I, as shown at same figure, or for raising the lower end of the platform and the rake teeth $g^4$ when said standards are adjusted to hold the rake bars in their lower positions, as shown by the other figures.

I do not claim herein the adjustable shoe M, nor broadly the combination of the adjustable shoe with the adjustable standards E and I, as such is shown, described and claimed in the application of Charles E. White and Charles P. A. Friberg for hay rake and loader, hereinbefore referred to.

A draft bar N and hounds $n$, project from a bar $a^8$, as shown by dot lines at Fig. 1, which bar $a^8$ is journaled on the axle. A clevis bar $n'$ is fixed to the forward end of the draft bar N, and is forked to receive a bracket or bar $n^2$ which projects rearwardly from a part $n^3$ of a wagon or hay rack to which the raker and loader is to be attached. A pin $n^4$ couples the bars $n'$ and $n^2$ together. I have shown the pin $n^4$ with an eye at its upper end for the attachment thereto of a cord $n^5$ which extends upwardly over a pulley $n^6$, and to an eye bolt $n^7$, at the upper end of the inclined platform, where it is secured so that the driver or person on the load of hay can, when the hay rack is loaded, pull on the cord $n^5$ and withdraw the pin $n^4$ from the bars $n'$, $n^2$, and thus uncouple the rake and loader from the hay wagon without dismounting from the load of hay.

A bar P pivoted at its upper end to a short standard $p$ which is pendent from the bottom or bed of the platform, extends downwardly through a hole in the front end of the draft bar N. A pin $p^2$ in the lower end of the bar P serves mainly to support the draft bar N when not attached to a hay wagon. A spiral spring $p'$ encircles the bar P between the draft bar N, and a sliding head or stop $p^3$, which has an aperture through which the bar P very loosely passes, to permit of oscillating or swinging an arm $p^4$ which is integral with the head $p^3$, and is pivotally connected at its outer end with a hand lever $p^5$, at $p^6$, a short distance from where said hand lever is fulcrumed, at $p^7$, at its ends to a block $p^8$ which is adjustable on the bar P, and is fixed after adjustment thereon by a hand wheel nut $p^9$ and bolt $p^{10}$. In turning the hand lever $p^5$ down to the position shown at Fig. 2, the arm $p^4$ and part of the hand lever will act as a toggle joint in compressing the spring $p'$ with much force. When the hand lever is turned down as last described, the points $p^3$, $p^6$, and $p^7$ being in line will lock and hold the head $p^3$ in a fixed position, so that the tension of the spring acting on the bar P, and thence on the inclined platform forward of the axle will hold the rake teeth $g^4$ to the ground with a yielding spring force, with all of the attendant advantages thereof. By turning the hand lever up at its distal end the tension on the spring $p'$ can be easily and quickly removed, and the draft bar N may then be easily raised and lowered as found necessary to couple to the bar $n^2$ which projects from a hay wagon after which the machine is drawn to rake and load the hay thereon. While the tension is so removed from the spring, the head $p^8$ may be adjusted and fixed on the bar P to give the spring any degree of tension required, when the lever is again turned down as shown at Fig. 2.

I do not herein claim the means shown and described herein for adjusting the tension on the spring, or releasing the tension therefrom, as both of these inventions are shown described and claimed in another application filed by me for patent for hay rake and loader, Serial No. 457,701, filed January 6, 1893. Neither do I, as sole inventor, herein broadly claim the adjustable standards, for adjusting, limiting or controlling the approach of the rake bars, at their upper ends, to the underlying frame, as such subject matter is shown, described and claimed in the joint application of myself and Charles P. A. Friberg, Serial No. 457,457, filed January 6, 1893.

To facilitate the removal of the rake teeth from the hay without lifting any portion of the hay as the rake bars rise therefrom, the teeth $g^2$, in an ordinary manner, are nearly or altogether at a right angle to the rake bars at the lower ends of said bars where the rake bars are lifted by the multiple crank shaft nearly directly at a right angle from the hay, and are more inclined to the rake bars, as their location approaches the upper ends thereof where the teeth are drawn obliquely from the hay.

The teeth $g^2$ are staple shaped, and each placed astride a rake bar, to form two teeth, connected below the rake bar by a bridle bar $g^{15}$, and held in place by a staple $g^6$ which can be driven into the rake bar in proper place to give the desired angle to the teeth. I do not herein claim this method of securing the rake teeth to the rake bars, as I believe such subject-matter to be the invention of Charles P. A. Friberg.

The gist of my invention rests in providing a rock shaft, located above the upper ends of the rake bars, and operated by the multicrank shaft which operates the rake bars, and which is connected with the rake bars in such manner that rocking in one direction it will raise the upper ends of one gang of said rake bars, and in an opposite direction will raise the other gang thereof. I have shown that mode of carrying out the broad invention made by me which I have thus far devised, and which is well adapted to the general class of hay rakes and loaders hereinbefore referred to; but I desire to be understood as considering the scope of my invention as covering not only the particular means shown for transmitting motion from the rock shaft to the rake bars, but also any organization in which the described novel principle or mode of operation is embodied, that is a rock shaft located as described, operated by the multicrank shaft, and connected with the upper ends of the rake bars by mechanism whereby one gang of the rake bars will be lifted at their upper ends when the rock shaft swings in one direction, and the other gang lifted when the rock shaft swings in an opposite direction.

Having thus described my invention, what I claim as new, and desire to secure by Letters Patent, is—

1. In a hay rake and loader, and in combination substantially as hereinbefore described, with an inclined platform, hay elevating rake bars and a multicrank shaft for operating said rake bars, a rock shaft located above the upper ends of the rake bars, and flexible rake bar lifters, connecting said rock shaft and the upper ends of the rake bars.

2. In a hay rake and loader, and in combination substantially as hereinbefore described, with an inclined platform, hay elevating rake bars and a multicrank shaft for operating said rake bars, a rock shaft located above the upper ends of the rake bars and operated by the multicrank shaft, and flexible rake bar lifters connecting said rock shaft, and the upper ends of the rake bars, one series of which lifters wind in one direction on said rock shaft and the other series wind in an opposite direction thereon, and one series of which are connected with the rake bars of one gang thereof to lift them with a positive motion and the other series with the rake bars of the other gang thereof to lift them with a positive motion.

3. In a hay rake and loader, and in combination substantially as hereinbefore described, with an inclined platform, hay elevating rake bars, and a multicrank shaft for operating said rake bars, a rock shaft located above the upper ends of the rake bars and geared with to be oscillated or rocked back and forth by said multicrank shaft, and mechanism connecting the rock shaft and the upper ends of the rake bars, whereby the rock or swing of the rock shaft in one direction will lift the upper ends of one gang of rake bars, and its rock or swing in an opposite direction will lift the upper ends of the other gang of rake bars.

4. In a hay rake and loader, and in combination substantially as hereinbefore described, with an inclined platform, hay elevating rake bars, and a multicrank shaft for operating said rake bars, a rock shaft located above the upper ends of the rake bars and geared with to be oscillated or rocked back and forth by said multicrank shaft, flexible chains or cords fixed at one end to the rake bars and at their other ends to the rock shaft, one series thereof to wind in one direction on the rock shaft and thereby lift the upper ends of one gang of rake bars, and the other series thereof to wind in an opposite direction on the rock shaft and thereby lift the upper ends of the other gang of rake bars.

5. In a hay rake and loader, and in combination substantially as hereinbefore described, with an inclined platform, hay elevating rake bars, and a multicrank shaft for operating said rake bars, a rock shaft located above the upper ends of the rake bars and geared with to be oscillated or rocked back and forth by said multicrank shaft, flexible chains or cords fixed at one end to the rake bars, and extending upwardly and laterally from each rake bar to the rock shaft to which they are fixed at their other ends, one series thereof to wind in one direction on the rock shaft and thereby lift the upper ends of one gang of rake bars, and the other series to wind in an opposite direction on the rock shaft and thereby lift the upper ends of the other gang of rake bars.

6. In a hay rake and loader, and in combination substantially as hereinbefore described, with an inclined platform, multicrank shaft, and rake bars operated thereby, a rock shaft geared with the multicrank shaft to be oscillated or rocked back and forth thereby, lifting mechanism connecting said rock shaft, and the upper ends of the rake bars, whereby when the rock shaft is rocked or swung in one direction one gang of rake bars is lifted thereby, and when the rock shaft is rocked or swung in an opposite direction the other gang of rake bars are lifted thereby, and adjustable standards to which the rock shaft is journaled.

7. In a hay rake and loader, and in combination substantially as hereinbefore described, with an inclined platform, multicrank shaft, and rake bars operated thereby, a rock shaft provided with a crank having a series of holes a connecting rod connecting with either of said holes at one end and at its other end with a crank arm on the end of the multicrank shaft, and rake bar lifters connecting the rock shaft and the upper ends of the rake bars, whereby the rock or swing of the rock shaft in one direction will lift the upper ends of one gang of rake bars, and its rock or swing in an opposite direction will lift the other gang of rake bars.

8. In a hay rake and loader, and in combination substantially as hereinbefore described, with an inclined platform, hay elevating rake bars, and a multicrank shaft for operating said rake bars, a rock shaft located above the upper ends of the rake bars and provided with a crank arm at one end thereof, which is adjustably connected with one end of a connecting rod by a series of holes in said rod, the other end of which rod is connected with a crank arm on the multicrank shaft, and rake bar lifters interposed between the rock shaft and the upper ends of the rake bars, whereby the rock or swing of the rock shaft in one direction will lift the upper ends of one gang of rake bars, and its rock or swing in an opposite direction will lift the upper ends of the other gang of rake bars.

9. In a hay rake and loader, and in combination substantially as hereinbefore described, an inclined platform, multicrank shaft, rake bars operated by said multicrank shaft, a rock shaft located at or near to the upper end of said inclined platform intergear mechanism connecting said rock shaft and multicrank shaft, rake bar lifting mechanism interposed between said rock shaft and the rake bars, whereby when the rock shaft is rocked or swung in one direction by the multicrank shaft one gang of rake bars is lifted thereby, and when said rock shaft is rocked or swung in an opposite direction the other gang of rake bars is lifted thereby.

In testimony whereof I affix my signature in presence of two witnesses.

CHARLES E. WHITE.

Witnesses:
W. J. ENTRIKIN,
J. A. ENTRIKIN.